(12) United States Patent
diGirolamo et al.

(10) Patent No.: US 7,503,150 B1
(45) Date of Patent: Mar. 17, 2009

(54) CONNECTOR ASSEMBLY FOR ALLOWING RELATIVE MOVEMENT BETWEEN TWO BUILDING MEMBERS

(75) Inventors: Edward R. diGirolamo, Raleigh, NC (US); Michael Torres, Raleigh, NC (US); Gary Bennett, Macon, NC (US); Michael Booth, Raleigh, NC (US)

(73) Assignee: The Steel Network, Inc., Raleigh, NC (US)

( * ) Notice: Subject to any disclaimer, the term of this patent is extended or adjusted under 35 U.S.C. 154(b) by 501 days.

(21) Appl. No.: 10/886,358

(22) Filed: Jul. 7, 2004

Related U.S. Application Data

(63) Continuation-in-part of application No. 10/689,498, filed on Oct. 20, 2003, now Pat. No. 7,104,024.

(51) Int. Cl.
  *E04C 3/04* (2006.01)
(52) U.S. Cl. .............................. 52/702; 52/703; 52/710; 52/167.1; 403/403
(58) Field of Classification Search .................... 52/703, 52/712, 702, 696, 710, 167.1, 656.9, 713, 52/235; 403/403, 231, 2, 233, 234
  See application file for complete search history.

(56) References Cited

U.S. PATENT DOCUMENTS

| | | | |
|---|---|---|---|
| 1,400,007 A | | 12/1921 | Sparks |
| 1,691,784 A | | 11/1928 | Pietzsch |
| 1,729,935 A | | 10/1929 | Froehlich |
| 2,065,529 A | * | 12/1936 | Kehr et al. ..................... 52/774 |
| 2,365,478 A | * | 12/1944 | La Grotta ..................... 52/242 |
| 3,003,600 A | | 10/1961 | MacKenzie |
| 3,327,438 A | * | 6/1967 | Cooper ........................ 52/205 |
| 3,451,183 A | * | 6/1969 | Lespagnol et al. ......... 52/656.1 |
| 3,490,797 A | * | 1/1970 | Platte ........................ 52/282.1 |
| 3,715,850 A | | 2/1973 | Chambers |
| 3,798,865 A | * | 3/1974 | Curtis .......................... 52/665 |
| 3,898,782 A | * | 8/1975 | Donato .................... 52/506.08 |
| 4,251,969 A | | 2/1981 | Bains |
| 4,261,593 A | | 4/1981 | Yeager |
| 4,363,459 A | | 12/1982 | Holzer |
| 4,464,074 A | * | 8/1984 | Green et al. ................. 403/192 |

(Continued)

FOREIGN PATENT DOCUMENTS

JP   54-69651   *  6/1979   ................. 403/353

*Primary Examiner*—Phi Dieu Tran A
(74) *Attorney, Agent, or Firm*—Coats & Bennett, P.L.L.C.

(57) ABSTRACT

A connector assembly for a building structure is provided. The connector assembly includes an elongated track that is mounted to a first member of a building frame structure. A connecting member is connected to the elongated track and retained within a pair of opposed channels that form a part of the track. Connected to the connecting member is a second member of the building frame structure. Formed in the connecting member is at least one elongated slot that permits the connecting member to be connected to the second member and for there to be relative movement between the connecting member and the second member. Further, the connecting member is slidable back and forth within the elongated track. Thus, it is appreciated that bidirectional movement between the first and second members can be accommodated by the connecting member sliding back and forth along the track on one hand and by there being relative movement about the connection between the connecting member and the second member.

18 Claims, 5 Drawing Sheets

U.S. PATENT DOCUMENTS

| | | | |
|---|---|---|---|
| 4,586,841 A * | 5/1986 | Hunter | 403/230 |
| 4,665,672 A * | 5/1987 | Commins et al. | 52/295 |
| 4,796,403 A | 1/1989 | Fulton et al. | |
| 4,949,929 A | 8/1990 | Kesselman et al. | |
| 4,973,102 A | 11/1990 | Bien | |
| 5,009,557 A | 4/1991 | Dessirier | |
| 5,027,494 A | 7/1991 | Martin | |
| 5,180,250 A * | 1/1993 | Ferro | 403/252 |
| 5,195,289 A * | 3/1993 | LaLonde et al. | 52/506.06 |
| 5,375,384 A * | 12/1994 | Wolfson | 52/295 |
| 5,529,273 A * | 6/1996 | Benthin | 248/254 |
| 5,577,860 A * | 11/1996 | Plank | 403/403 |
| 5,664,392 A | 9/1997 | Mucha | |
| 5,671,580 A | 9/1997 | Chou | |
| 5,720,571 A | 2/1998 | Frobosito et al. | |
| 5,846,018 A | 12/1998 | Frobosito et al. | |
| 5,876,006 A * | 3/1999 | Sharp et al. | 248/297.12 |
| 5,906,080 A * | 5/1999 | diGirolamo et al. | 52/243.1 |
| 5,937,605 A * | 8/1999 | Wendt | 52/506.06 |
| 6,058,668 A | 5/2000 | Herren | |
| 6,158,188 A * | 12/2000 | Shahnazarian | 52/702 |
| 6,199,929 B1 | 3/2001 | Hansch | |
| 6,213,679 B1 | 4/2001 | Frobosito et al. | |
| 6,250,041 B1 * | 6/2001 | Seccombe | 52/712 |
| 6,612,087 B2 | 9/2003 | diGirolamo et al. | |
| 6,880,302 B1 * | 4/2005 | Fontaine | 52/222 |

* cited by examiner

US 7,503,150 B1

CONNECTOR ASSEMBLY FOR ALLOWING RELATIVE MOVEMENT BETWEEN TWO BUILDING MEMBERS

CROSS REFERENCE TO RELATED APPLICATION

This is continuation-in-part of U.S. patent application Ser. No. 10/689,498 filed Oct. 20, 2003 now U.S. Pat. No. 7,104,024. The disclosure of this application is expressly incorporated herein by reference.

FIELD OF THE INVENTION

The present invention relates to light steel framing and more particularly, to a connector for connecting two structural members together in a manner that will allow one of the members to move relative to the other member.

BACKGROUND OF THE INVENTION

Seismic activity plagues buildings and their inhabitants in many areas of the world, causing untold amounts of damage and monetary loss in addition to injury and loss of life. Building damage is mainly due to the vibration of a building which causes shifts of one portion of the building frame with respect to another portion. In conventional construction, the building components are rigidly locked together and their connective joints will fracture under the vibrational stress, often resulting in collapse.

U.S. Pat. No. 5,467,566 for a Curtain Wall Clip; U.S. Pat. No. 5,876,006 for a Stud Mounting Clip; and U.S. Pat. No. 5,906,080 for a Bracket For Interconnecting A Building Stud To Primary Structural Components each provide connective building components which permit relative movement between structural members in a vertical direction. The teachings of each of these patents are incorporated by reference. These patents all recognize an important need to permit building frame members to shift rather than fracture. However, none of these patents provides for movement in a horizontal plane, although this movement does occur during an earthquake. Thus, while the building floor is free to move relative to its walls for a limited vertical distance when the known connectors are used, horizontal movement is not an option. When the seismic vibration occurs in a direction to induce a horizontal shift, damage, injury, and death can still happen.

SUMMARY OF THE INVENTION

The present invention entails a connector assembly for connecting first and second building frame members and permitting relative movement between the first and second members. The connector assembly includes an elongated track adapted to connect to the first member. A connecting member is adapted to connect to a second member, and the connecting member connects to the track and is capable of moving back and forth along the track. The connecting member includes a base that moves along the track and an extension that extends outwardly from the track for connection to the second member. Thus, when the connector assembly is connected between the first and second members, the connecting member is permitted to move back and forth in response to relative movement between the first and second members.

In one particular embodiment, the connecting member is connected to the second member in such a way that the second member can actually move relative to the connecting member. At the same time, the connecting member is connected to the track such that it can move back and forth along the track. In this embodiment, it is appreciated that bidirectional movement can be achieved between the first and second members.

Further, the present invention includes a building frame structure where the connector assembly described above is connected between at least one horizontal member, such as a part of a floor system, and at least one vertical member, such as a stud.

Further, the present invention entails a method of providing for relative movement between first and second members of a building structure. The method entails attaching a track to one member and connecting a connecting member to the track such that the connecting member can slide along the track. Further, the method entails connecting the connecting member to the second building member and accommodating relative movement between the first and second members by moving the connecting member along the track.

Other objects and advantages of the present invention will become apparent and obvious from a study of the following description and the accompanying drawings which are merely illustrative of such invention.

DESCRIPTION OF THE INVENTION

Figure 1:
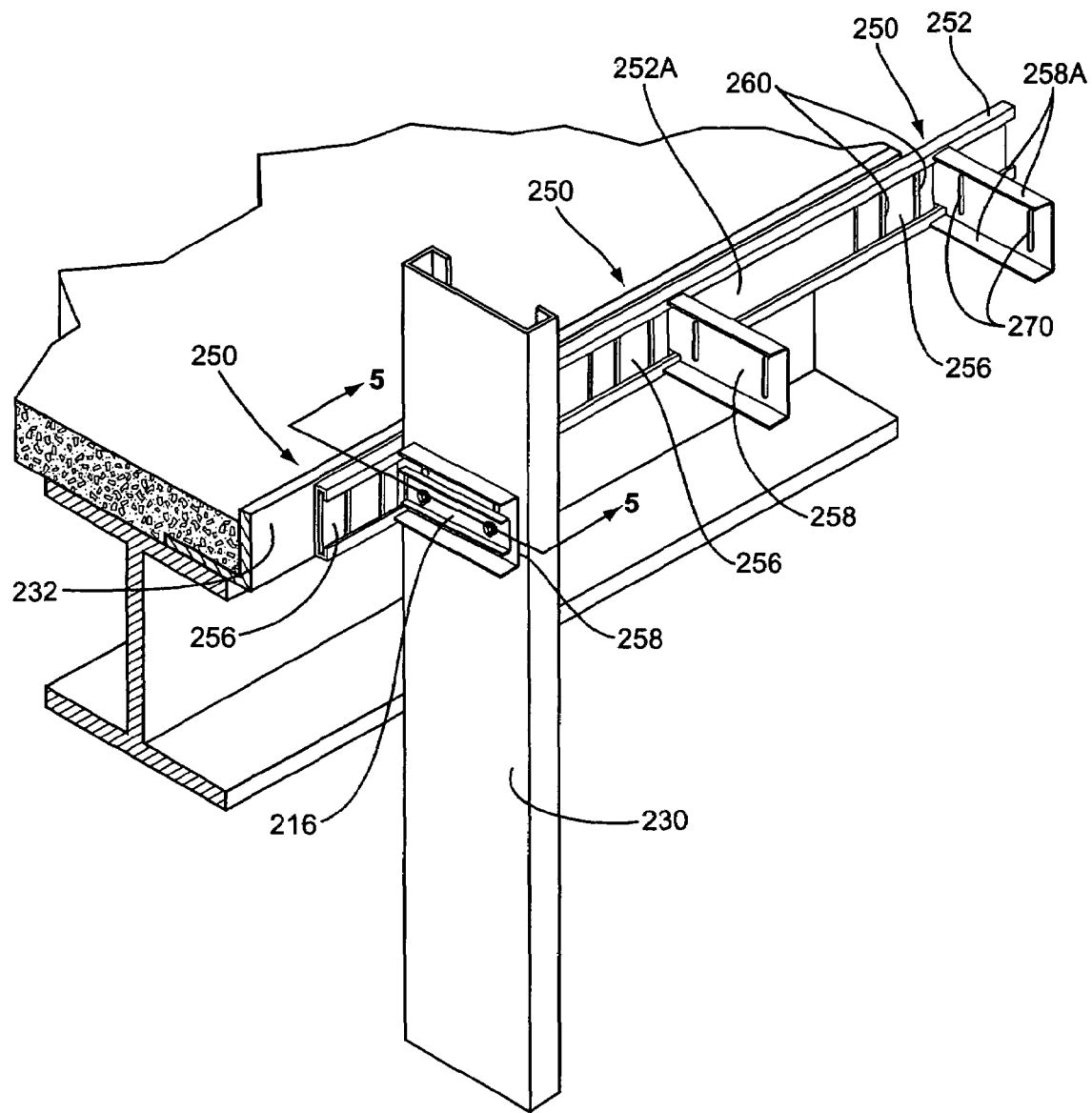
FIG. 1 is a perspective view of the connector assembly of the present invention showing the connector assembly being connected between first and second building members.
Figure 2:
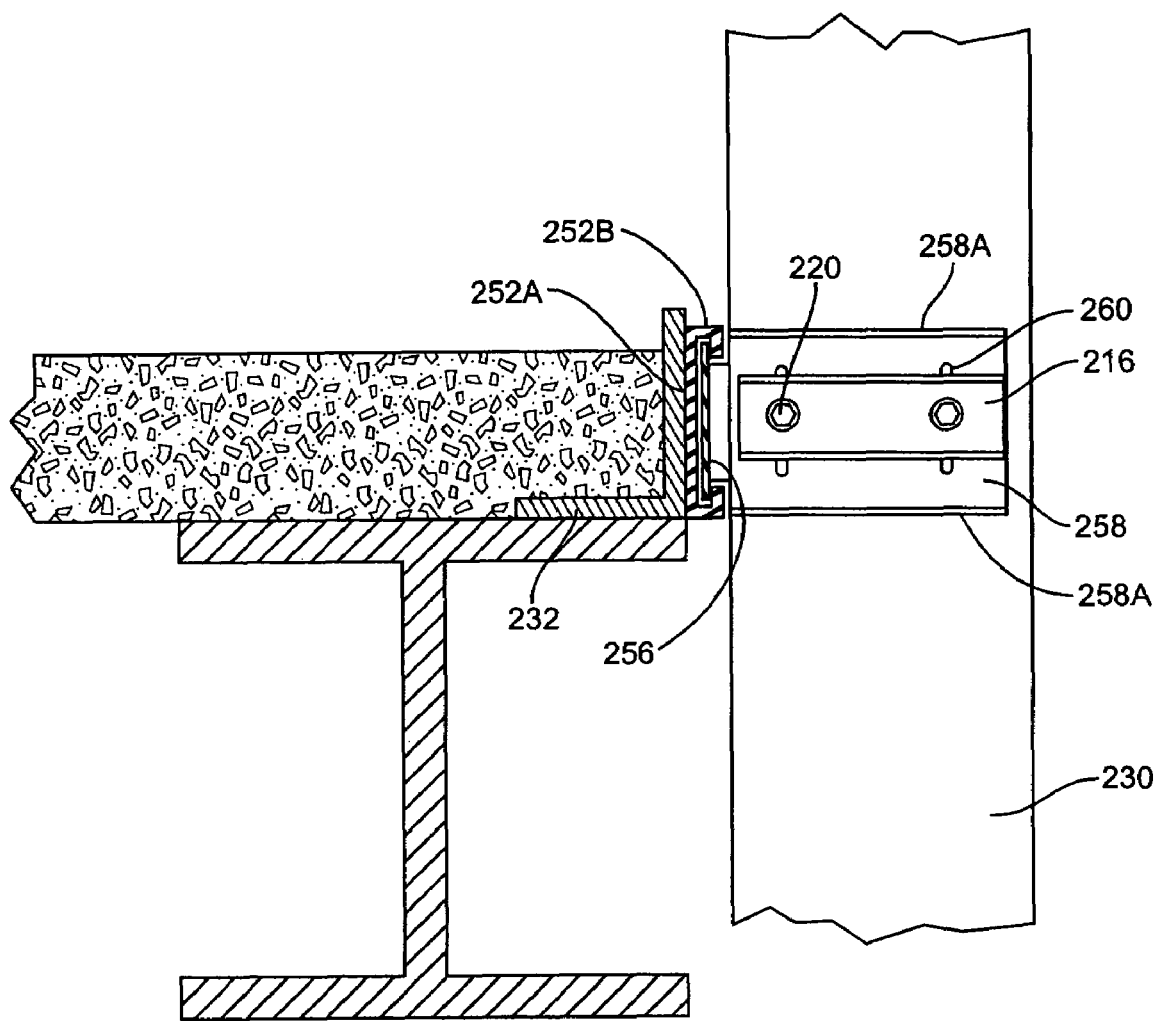
FIG. 2 is a cross sectional view taken through the line 2-2 of FIG. 1.
Figure 3:
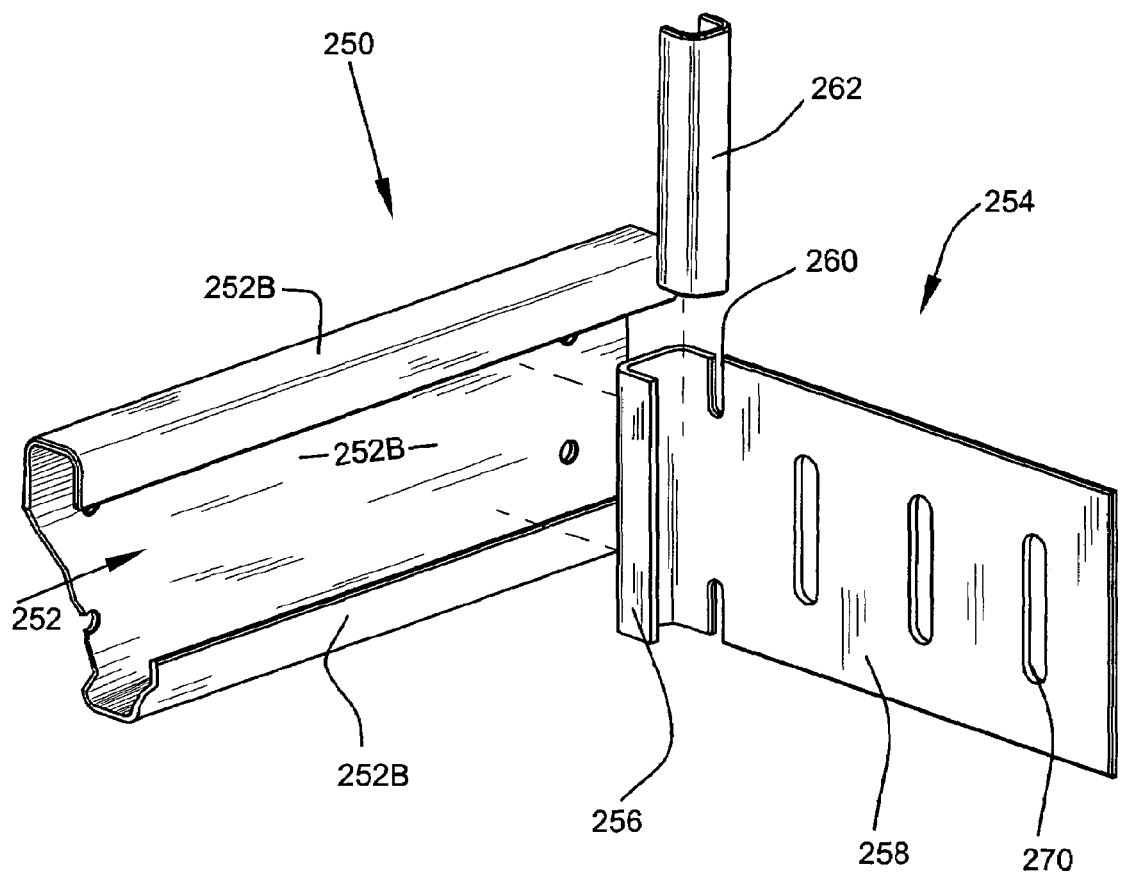
FIG. 3 is a perspective exploded view of an alternate design for the connector assembly.

With further reference to the drawings, particularly FIGS. 1 and 2, a connector assembly is shown and indicated generally by the numeral 250. Connector assembly 250 is connected between a first member 232 which in this case is a horizontal member that forms a part of a floor structure and a second member 230 that in this case is a vertical member and a stud. As will be appreciated from subsequent portions of this disclosure, when the connector assembly 250 is connected between the first and second members 230, 232 bidirectional movement is permitted between the first and second members.

Connector assembly 250 includes an elongated track 252 that in this case is secured to the first member 232. Elongated track 252 is generally C-shaped and includes a back or web 252A and opposed outer edge portions 252B. Outer edge portions 252B form a channel. This is particularly illustrated in FIG. 2.

Slidably mounted or contained within track 252 is a connecting member indicated generally by the numeral 254. Connecting member 254 in this embodiment includes a first portion or base 256 and a second portion or extension 258. Base 256 is contained within the elongated track 252 and slidable back and forth therein. That is, as illustrated in FIGS. 1 and 2, the base 256 of the connecting member 254 is disposed such that it lies adjacent the web 252A of the track 252 and the outer channels 252B of the track curl around and confine the base 256 within the elongated track. It thus follows, that the connecting member 254 can slide back and forth within the track.

Extension 258 of connecting member 254 extends outwardly from the track 252. This is illustrated in FIGS. 1 and 2. That is, extension 258 is oriented at an angle with respect to the base 256. In this case, the extension 258 is disposed generally at an angle of approximately 90° with respect to the base 256. As illustrated in the drawings, the base 256 can be provided with a series of ribs that reinforce the same. Extension 258 includes a pair of flanges 258A. Flanges 258A are turned to form a 90° angle with the central area of the extension 258.

A series of elongated slots 270 are formed in the extension 258. Various fastener means can be utilized to secure the extension 258 to the second building member or stud 230 shown in FIGS. 1 and 2. For example, fasteners and stepped washers as discussed and disclosed in the parent application Ser. No. 10/689,498, which has been incorporated herein by reference, can be used. This would, of course, permit the extension 258 to slide with respect to the second building member 230 even while the fasteners would retain the extension to the second building member. In the embodiment illustrated in FIGS. 1 and 2, there is provided a reinforcing member 216 that is disposed adjacent the extension 258 when the extension is coupled or secured to the second building member or stud 230.

In the embodiment of FIGS. 1 and 2, the base 256 and extension 258 of the connecting member 254 are of an integral construction. That is, in this particular embodiment, they are formed from a single piece of metal. An example of the construction of the connecting member 254 would entail cutting opposed slots from opposite edges of the connecting member 254 about a bend or juncture area. Thereafter, the connecting member 254 would be bent such that a selected angle is formed between the base 256 and extension 258. Thereafter, the flanges 258A would be formed by simply bending them to the position that they occupy in FIGS. 1 and 2. Of course, it is appreciated that other procedures can be followed to form or fabricate the connecting member 254. That is, and in the way of an example, the connecting member 254 could comprise a multi piece member.

As illustrated in FIG. 1, track 252 can accommodate a series of spaced apart connecting members 254. Connecting members 254 would be spaced such that they can move back and forth within the track 252. Consequently, it is appreciated that the entire connecting member 254 can move back and forth within the elongated track 252 in response to certain loads or forces being applied to the building structure. In addition there could be relative movement between the extension 258 of the connecting member 254 and the second building member 230.

Turning now to FIGS. 3-6, a second embodiment for the connector assembly 250 is shown therein. The connector assembly 250 shown in FIGS. 3-6 is similar to the connector assembly discussed above and shown in FIGS. 1-2. That is, the connector assembly 250 of this embodiment is designed to be connected between first and second members 232, 230 and to permit bidirectional movement between the first and second members.

In the second embodiment, the connector assembly 250 includes an elongated track 252. Track 252 includes a web 252A that includes spaced apart openings therein that permit track 252 to be secured by fasteners to the first building member 232. Formed on opposite edges of the track 252 is a pair of channels 252B. Each channel 252B includes a back flange and a side flange. The back flange and side flange cooperate with an adjacent portion of the web 252A to form a channel, slot or groove. This is particularly illustrated in FIG. 3.

Turning to the connecting member 254, as with the embodiment discussed above, this connecting member includes a base 256 and an extension 258. The base in this case is of a generally L-shape. That is, the base 256 includes a portion that extends generally normal with respect to the extension 258 and another end portion that is turned up and is sometimes referred to as a turned up flange. To reinforce the connecting member 254, the base 256 may include a reinforcing member 262. In this case the reinforcing member 262 is a piece of channel shaped metal. Reinforcing member 262 could be of a square or rectangular channel or could, as illustrated in the drawings herein, be of a slightly rounded channel shape. In any event, reinforcing member 262 can be inserted and secured within the connecting member 254. Various means can be utilized to secure the reinforcing member 262. In one embodiment, the reinforcing member 262 would simply be taped into the base.

Extension 258 includes a series of elongated slots 270. Elongated slots 270 permit the extension 258 to be connected to the second building member 230. In particular, the elongated slots 270 with conventional fastening means will permit relative movement between the extension 258 and the second building member 230. Note in this case where the elongated slots 270 extend generally perpendicular with respect to the track 252.

Formed in the connecting member 254 is a pair of notches 260. Notches 260 are provided to accommodate a portion of the channels 252B that form a part of the track 252. That is, when the connecting member 254 is retained within the track 252, the back flanges of the channels 252B will extend through a portion of the notches 260. In addition, in installing the connecting member 254, the connecting member will be rotated to where the base 256 extends generally perpendicular to the length or longitudinal axis of the track 252. During this rotation, the notches 260 will be rotated into and along the back flanges of each of the channels 252B.

Figure 4:
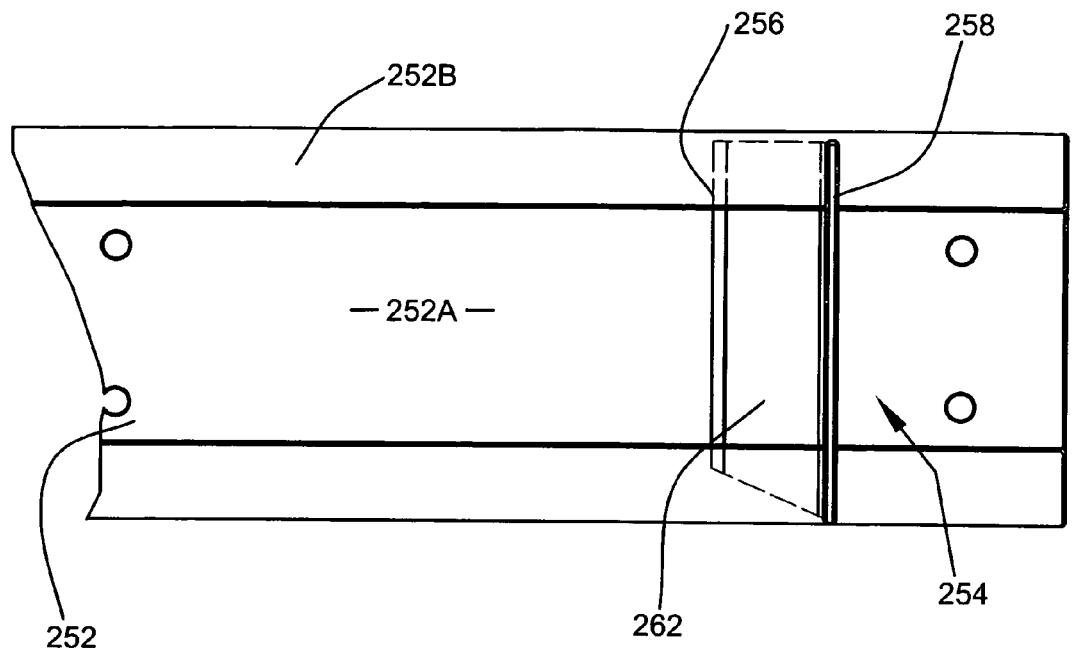
FIG. 4 is a side elevational view of the connector assembly of FIG. 3.
Figure 5:
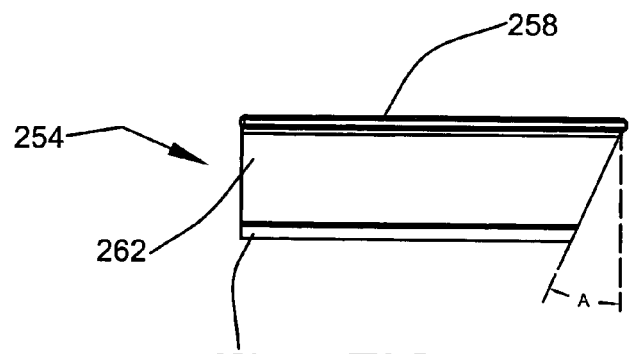
FIG. 5 is a view of the connecting member showing an angled portion of the base of the connecting member.

In FIGS. 4 and 5, it is noted that in this embodiment that a portion of the base 256 can be formed or cut at an angle to facilitate retaining the connecting member 254 to the track 252. That is, as viewed in FIG. 5, it is seen that the base 256 includes opposed end portions. In this embodiment, about one end portion of the base 256, the base is cut at an angle, identified by angle A. It is to be appreciated that if the reinforcing member 262 forms a part of the base, that it too would be cut or formed at this angle.

Figure 6:
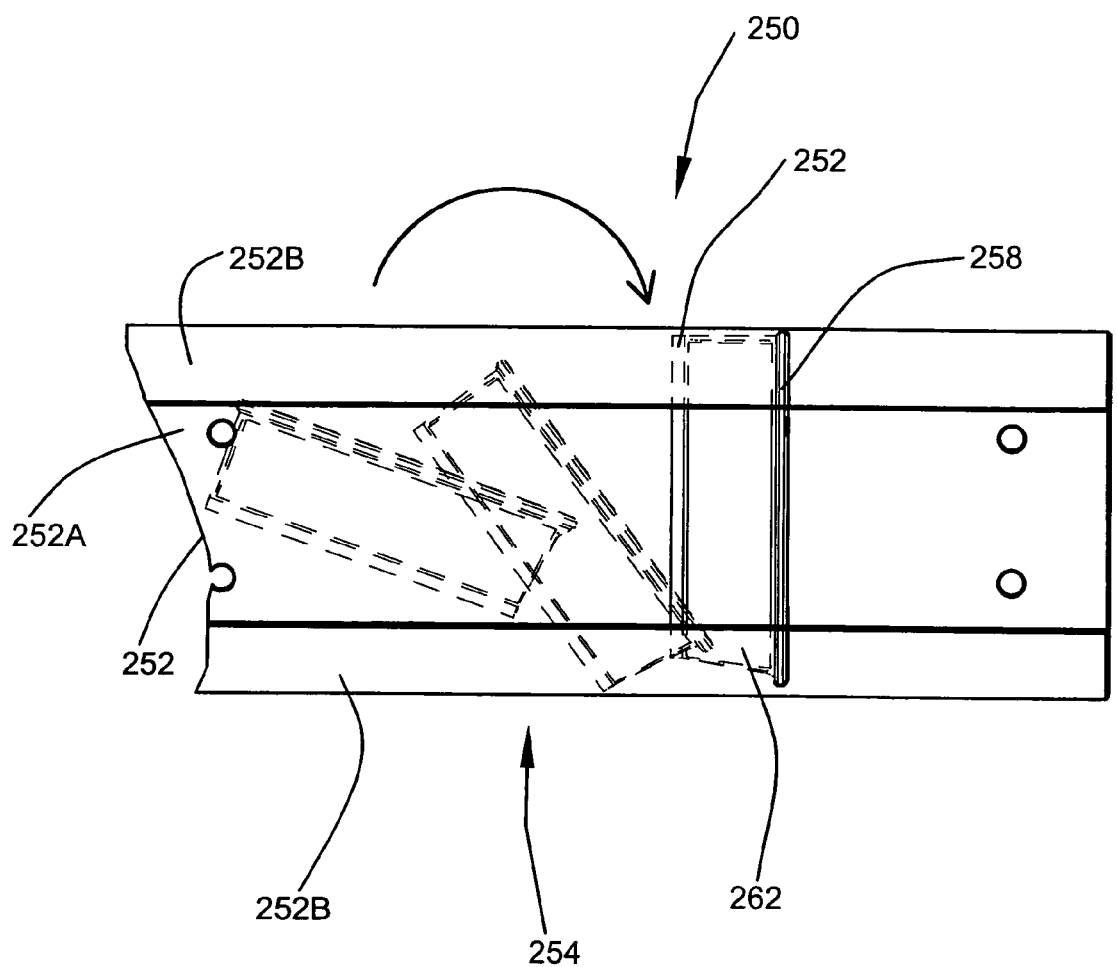
FIG. 6 is a side elevational view showing how the connector assembly is rotated into position in the track.

FIG. 6 illustrates how the connecting member 254 of this embodiment can be installed in the track 252. Connecting member 254 can be placed in the track such that the entire structure of the connecting member lies between the opposing channels 252B. Note in FIG. 6 within this initial position, the end portion of the base that includes the formed or cut angle A lies at about the four o'clock position. To install the connecting member 254, the same is rotated clockwise as viewed in FIG. 6. Thus, the angle end portion of the base is referred to as the leading end portion. As the leading end portion is rotated, it is appreciated that the angled end portion of the base 256 will permit the base or lower portion of the connecting member 254 to clear the side flanges of the channels 252B. During this rotation, it is appreciated that portions of the back flanges of the channels 252B will pass through the notches 260. In any event, the connecting member 254 can be rotated clockwise as viewed in FIG. 6 until the connecting member reaches approximately the position shown in full lines in FIG. 6.

Connecting member 254 and particularly the area thereof about the base 256 is dimensioned or configured such that when the connecting member is rotated into the position shown in full lines in FIG. 6 that portions of the connecting member 254 will come into contact with the track and particularly portions of the channels 252B such that continued clockwise rotation, as viewed in FIG. 6, cannot be achieved. That is, the connecting member 256 is not permitted to be completely rotated in one direction into, through and out of the channels 252B. It follows then, to remove the connecting member 254 from the channels 252B, that the connecting member 254 would be rotated counterclockwise as viewed in FIG. 6, until the structure of the connecting member 254 clears the channels. Once the structure clears the channels, it follows that the entire connecting member 254 can be removed.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A connector assembly for connecting first and second members and permitting relative movement between the first and second members, the connecting assembly comprising:
   a. an elongated track adapted to connect to the first member and having a web and opposed edge portions that form a pair of slide channels;
   b. a connecting member adapted to connect to the second member and connected to the track for back and forth movement therein;
   c. the connecting member including opposed end portions and a base that fits in the channels and is movable within the channels along the track, and wherein the channels retain the connecting member to the track;
   d. the base of the connecting member including a channel that extends across one end portion of the connecting member wherein the channel includes open opposed ends and an open side;
   e. a substantially U-shaped reinforcing member disposed in the channel of the base and extending substantially between the open ends of the channel of the base;
   f. the connecting member including an extension that extends from the base and wherein the extension is adapted to connect to the second member;
   g. wherein when the connector assembly is connected between the first and second members, the connecting member is permitted to move back and forth in the track in response to relative movement between the first and second members; and
   h. wherein the base includes opposed end portions and wherein at least one end portion of the base is cut at an angle such that the base can be rotated into a position where both end portions of the base project into the channels, and wherein the angle cut of the base permits the base to be rotated into the channels, but does not permit the base to be continuously rotated 360° in one direction through the opposed channels.

2. The connector assembly of claim 1 wherein the connector assembly forms a part of a building frame structure wherein the first and second members comprise at least one vertical member and one horizontal member.

3. The connector assembly of claim 2 wherein the track is adapted to connect to the horizontal member.

4. The connector assembly of claim 3 wherein the horizontal member to which the track is connected forms part of a floor structure; and wherein the vertical member comprises a stud that is connected to the connecting member.

5. The connector assembly of claim 1 wherein the connecting member includes a pair of notches for receiving at least a portion of the opposed channels such that as the connecting member moves in the track, a portion of each channel passes through a respective notch.

6. The connector assembly of claim 1 wherein each channel includes side and back flanges that together with a portion of the web form the channel.

7. The connector assembly of claim 6 wherein the connecting member includes a pair of notches and wherein the back flange of each channel projects into one of the notches when the connecting member is connected to the track.

8. The connector assembly of claim 1 wherein the length of the base permits the base to project into each of the channels when the connecting member is connected to the track.

9. The connector assembly of claim 1 wherein the extension includes at least one elongated slot that extends generally perpendicular to the track when the connector assembly is connected to the track.

10. The connector assembly of claim 1 wherein the reinforcing member extends through the channel of the base.

11. The connector assembly of claim 1 wherein the extension and at least a part of the base are constructed from a single piece of metal, and wherein the base includes a portion that is turned at an angle of approximately 90° with respect to the extension.

12. The connector assembly of claim 1 wherein only one end portion of the base is cut at an angle, and wherein the end portion of the base opposite the end cut at an angle extends in generally the same direction as the elongated track when the connecting member is connected to the track.

13. A building connector assembly for connecting first and second building members together such that one member can move relative to the other, the building connector assembly comprising:
   a. a track for connecting to one member;
   b. a connecting member for connecting to the second member;
   c. the connecting member connected to the track and movable back and forth along the track;
   d. the connecting member including opposed end portions, a base, and an extension that extends outwardly from the track for connecting to the second member;
   e. the base of the connecting member including a channel that extends across one end portion of the connecting member wherein the channel includes open opposed ends and an open side;
   f. a substantially U-shaped reinforcing member disposed in the channel of the base and extending substantially between the open ends of the channel of the base;
   g. wherein the building connector assembly permits relative movement between the first and second members by permitting the connecting member to slide back and forth along the track;
   h. wherein the track includes opposed channels, and wherein the connecting member includes a base and an extension, and wherein the base is retained in the opposed channels and is permitted to slide back and forth therein
   i. wherein the base includes opposed end portions, and wherein at least one end portion of the base is formed at an angle so as to permit the base to be rotated into a position where the base extends between the opposed channels and projects into the opposed channels; and j. wherein the angle formed at one end portion of the base permits the base to be rotated into a position where the base extends between the opposed channels, but wherein the length of the base is such that the base can not be rotated 360° in one direction through the channels.

14. The connector assembly of claim 13 wherein the connecting member includes at least one elongated slot that enables the connecting member to be secured to the second member so as to permit relative movement between the connecting member and the second member; and wherein the connecting member is movable along the track so as to provide bidirectional movement between the first and second members.

15. The connector assembly of claim 13 wherein the connector assembly forms a part of a building frame structure including at least one horizontal member and at least one vertical member; the connector assembly adapted to connect between the horizontal and vertical members with the track adapted to connect to one of the horizontal or vertical members and the connecting member adapted to connect to the other horizontal or vertical member; and wherein in response to relative movement between the horizontal and vertical members, the connecting member is operative to move along the track.

16. The connector assembly and building frame structure of claim 15 wherein the connecting member includes means that permits the connecting member to be connected to one of the horizontal or vertical members and to move relative thereto.

17. The connector assembly of claim 13 wherein the connecting member includes a pair of notches for receiving a portion of the opposed channels such that as the connecting member moves back and forth along the track at least a portion of the opposed channels pass through the notches.

18. The connector assembly of claim 13 wherein one end portion of the base is cut at an angle and the other end portion extends generally perpendicular to the plane of the extension to form a squared-off end that extends generally parallel with respect to the channels.

* * * * *